July 31, 1956

W. A. PENNOW 2,757,277

LAMP SUPPORTING APPARATUS

Filed Feb. 26, 1953

WITNESSES:

E. A. McCloskey.

Wm. La Groove

INVENTOR
Willis A. Pennow.
BY
Arthur T. Stratton
ATTORNEY

July 31, 1956 W. A. PENNOW 2,757,277
LAMP SUPPORTING APPARATUS
Filed Feb. 26, 1953 5 Sheets-Sheet 2

WITNESSES:
E. A. McCloskey.
Wu. La Groove

INVENTOR
Willis A. Pennow.
BY
Arthur T. Stratton
ATTORNEY

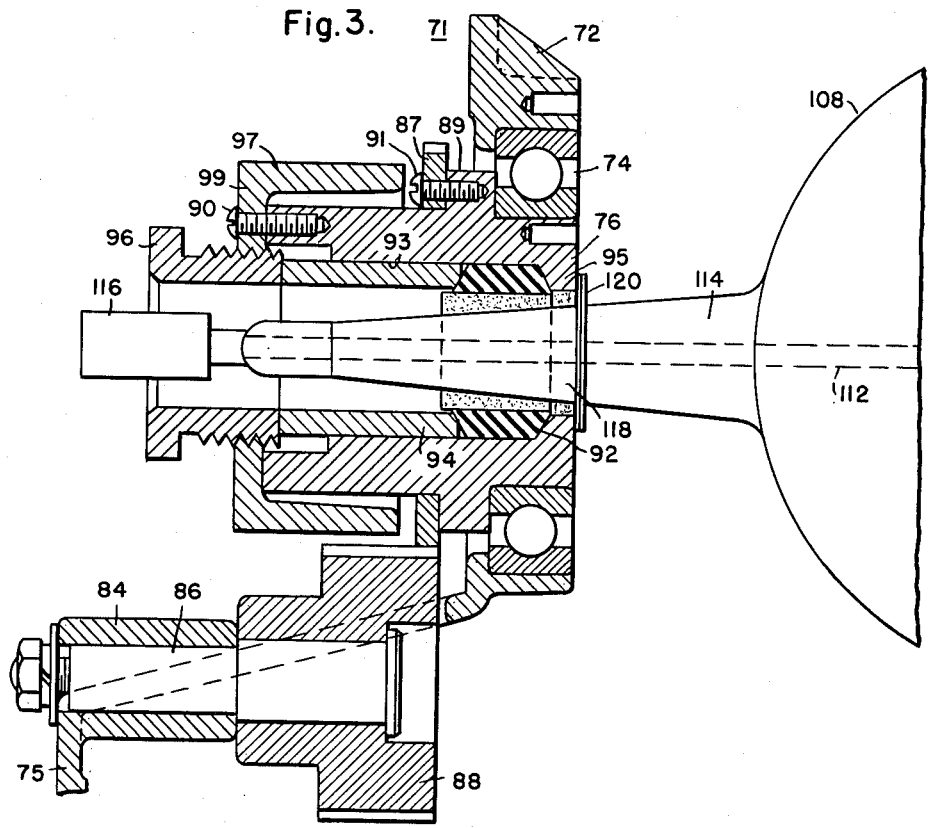
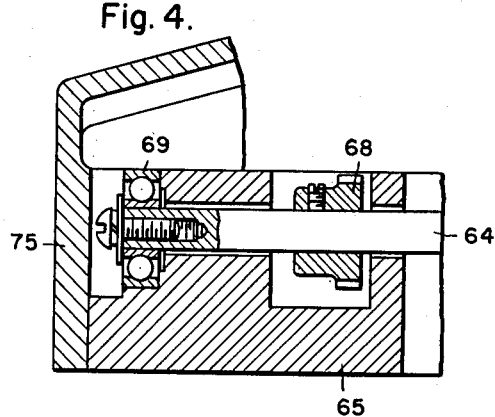

July 31, 1956  W. A. PENNOW  2,757,277
LAMP SUPPORTING APPARATUS
Filed Feb. 26, 1953  5 Sheets-Sheet 4

WITNESSES:
E. A. McCloskey.
N.W. L. Groome

INVENTOR
Willis A. Pennow.
BY
Arthur T. Stratton
ATTORNEY

United States Patent Office 2,757,277
Patented July 31, 1956

2,757,277

LAMP SUPPORTING APPARATUS

Willis A. Pennow, Cleveland, Ohio, assignor to Westinghouse Electric Corporation, East Pittsburgh, Pa., a corporation of Pennsylvania Application February 26, 1953, Serial No. 339,070

15 Claims. (Cl. 240—41)

This invention relates, generally, to supporting apparatus for electric discharge devices, and more especially to such apparatus for supporting high intensity short arc type lamps.

Lamps of this type, such as short arc mercury lamps, particularly in the higher wattages, have the characteristic of the common flaming arc, namely, that a considerable flame is produced, and if allowed to deviate so that it is adjacent to or in contact with one portion of the lamp envelope for any appreciable time, on the order of one minute, will result in softening of the envelope and failure of the lamp. Accordingly, in the past these lamps have either been operated in a vertical position where the flame assumes a generally mushroom shape and does not deviate to either side into contact with the lamp envelope, or they have been equipped with means providing a strong external magnetic field to hold the arc and flame centrally in the lamp envelope.

The above limitations in using lamps of the short arc type prevent their efficient use for many purposes. Thus, for projector type equipment, such as spot, flood or searchlight equipment, the lamp can very seldom be maintained in a vertical position, and magnetic field producing devices must generally be located at the upper side of the longitudinal axis, and deviation of the arc flame and consequently the strength of the corrective magnetic field, are dependent on the angle which the lamp assumes with respect to the vertical.

Furthermore, magnetic field producing devices need to be located in areas where they obstruct useful light given out by the lamp. The luminous flux emission pattern from these lamps is generally toroidal in form so that conventional shallow parabolic reflectors positioned at one side of the lamp can utilize and control only a part of the available flux. Deep parabolic reflectors or ellipsoidal reflectors will best utilize the available flux from these lamps, but they require the lamp to be aligned with the optical axis of the reflector with the toroid concentric with the axis, so that a vertical lamp position cannot be employed, and, of course, a large portion of useful light would be obstructed if magnetic arc control apparatus were located at one side of the lamp envelope.

One object of this invention, therefore, is to provide novel apparatus for supporting a lamp of the type described which will permit efficient use of the lamp at any desired burning position.

More specifically, it is an object of this invention to provide novel apparatus for rotatably supporting a lamp of the type described, for rotation substantially on the longitudinal axis of the lamp, so that rotation of the lamp continuously presents new areas of the lamp envelope to any possible point of contact with the arc flame.

Another object of this invention is to provide novel apparatus for rotatably supporting a lamp of the type described at least at one end thereof, for rotation substantially on the longitudinal axis of the lamp.

Another object of this invention is to provide novel apparatus for rotatably supporting a lamp of the type described at both ends thereof, for rotation substantially about the longitudinal axis of the lamp, with the lamp resiliently supported for rotation in a manner such that no substantial mechanical stress is imposed on the lamp envelope.

Still another object of this invention is to provide novel apparatus for rotatably supporting a lamp of the type described with integrated means for cooling portions of the apparatus contiguous to the lamp.

These and other objects of this invention will become more apparent upon consideration of the following detailed description of a preferred embodiment thereof, in which:

Fig. 3 is an enlarged substantially central section view of one of the lamp supporting heads;

Fig. 4 is an enlarged section view of the lower portion of the lamp supporting head illustrated in Fig. 3;

Figure 1:
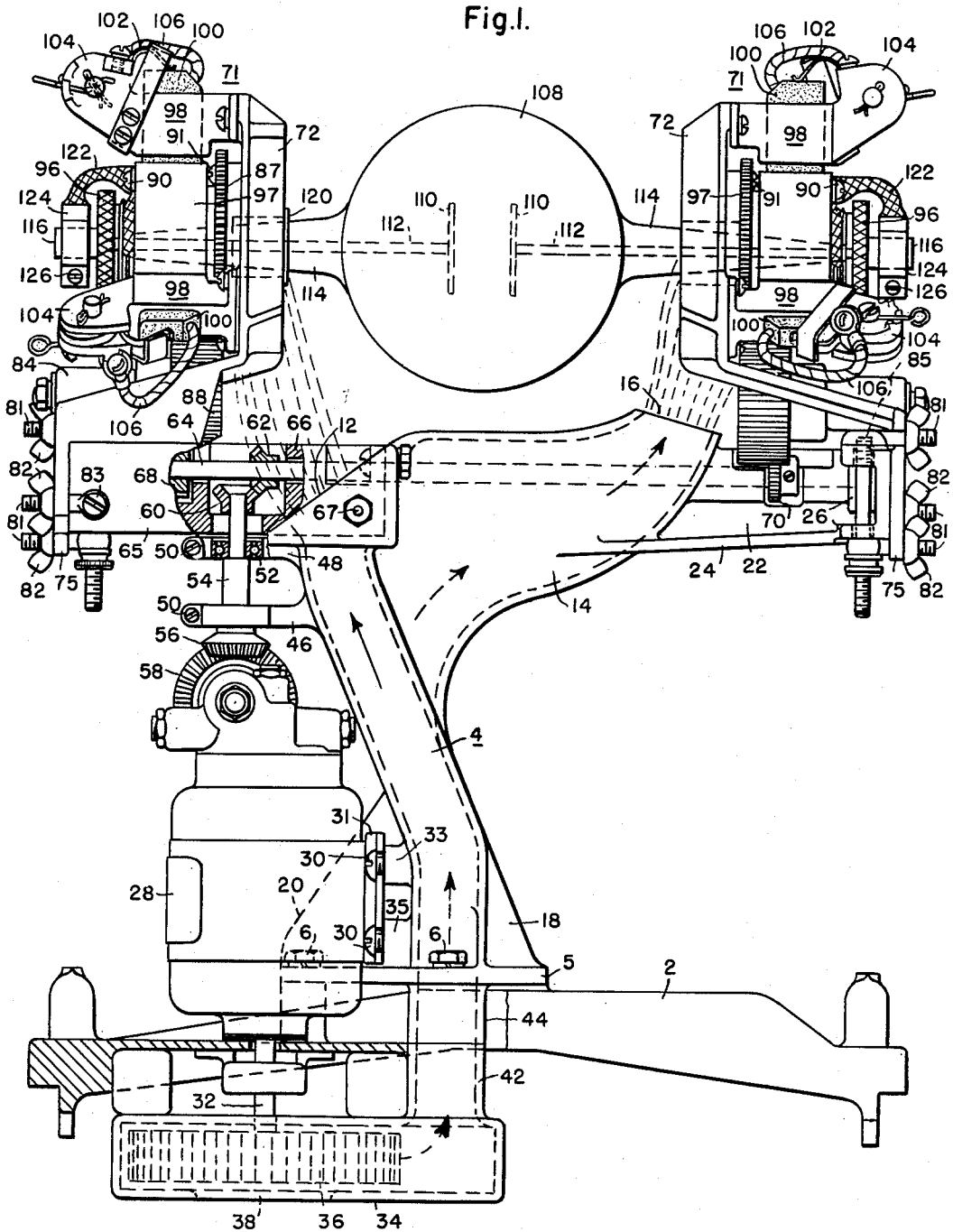
Figure 1 is an elevation view, partly in section, illustrating a lamp supporting apparatus constructed in accordance with this invention.

In the illustrative embodiment of the invention hereinafter specifically described and illustrated on the drawings, the lamp supporting apparatus comprises a base 2 which may be generally rectangular in form, and has secured substantially centrally thereof an upwardly extending hollow supporting casting 4, which is horizontally elongated in cross section. The hollow supporting casting 4 may be secured to the base 2 in any desired way, such for example as by bolts 6 which pass through a bottom flange 5 on the hollow supporting casting 4 and engage threaded openings in the base 2. The hollow supporting casting 4 has a side outlet opening 8 (Fig. 2) and a conduit 10 therein having an air directing pipe 11 and nozzle 13 at the upper end thereof, for a purpose to be described. The hollow casting 4 also has a top outlet opening 12, and a lateral integral hollow extension 14, preferably vertically elongated in cross section and terminating in another outlet opening 16.

The hollow supporting castings 4 may be provided with reinforcing webs 18 and 20 adjacent the lower end thereof joining the casting and its base flange 5. At the upper end of the lateral extension 14 of the supporting casting, a supporting web 22 may be extended outwardly beyond the outlet opening 16, and may be reinforced by a horizontal flange 24 integral with the lower side thereof, and it terminates in a bearing portion 26, for a purpose to be described.

An electric motor 28 is adapted to be supported on the hollow supporting casting 4, for example, as by screws 30 which engage a bracket 31 on the motor 28 and are threaded into bosses 33 and 35 integral with the hollow supporting casting 4. The lower end of the motor shaft 32 is adapted to extend through an opening in the base 2 and be connected with the shaft of an impeller 36 mounted in a scroll-shaped blower casing 34. An intake opening 38 is provided substantially centrally of the blower casing 34, and the outlet portion 42 of the casing is adapted to fit up against an extension 44 of the base flange 5 to be aligned therewith and open into the interior of the hollow supporting casting 4.

Figure 2:
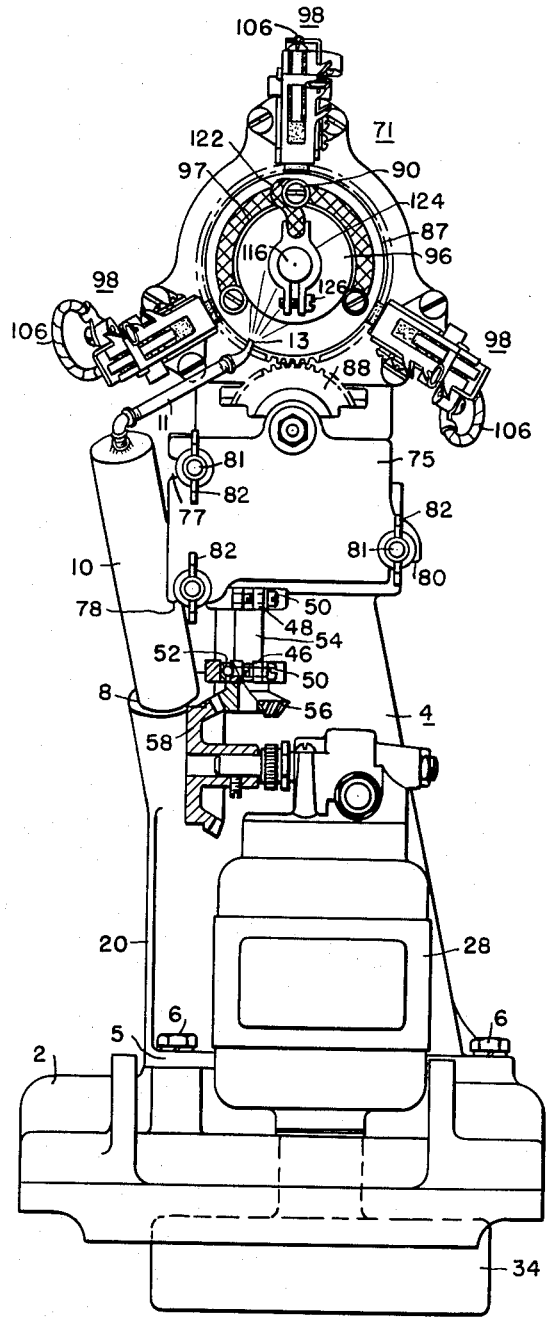
Fig. 2 is an end view of the apparatus shown in Fig. 1, with a portion being broken away and illustrated in section.

Above the motor, the hollow supporting casting 4 is provided with a pair of integral lateral extensions 46 and 48 which are apertured, and preferably split at their outer ends, being provided with clamping screws 50 for securing a bearing 52 in the opening of each of the extensions 46 and 48. Preferably, the bearings 52 are of the ball type as illustrated in Figs. 1 and 2. The bearings 52 are adapted to rotatably mount a drive shaft 54 which has a bevel pinion 56 at the lower end thereof which meshes with a bevel gear 58 actuated by the motor 28. The upper end of the drive shaft 54 has a bevel gear 60 secured thereon and it mates with a bevel gear 62 secured on a common drive shaft 64 which extends horizontally through the top of the hollow supporting casting 4. A supporting recess is provided in the upper end of the hollow supporting casting 4 adjacent the opening 12, for receiving a supporting block 65 which may be secured in position, for example, as by a bolt 67 passing through the block and flanges on the upper end of supporting casting 4. The horizontal common actuating shaft 64 is supported at one end by the bearing portion 26 of the hollow supporting casting 4, and at its other end by the bearing 69 (Fig. 4) provided in the supporting block 65. Intermediate bearing supports for the common actuating shaft 64 may be provided as desired, for example, such as the support 66 in block 65. Adjacent each end, the common actuating shaft 64 carries pinions 68 and 70, adapted to operate the two rotatable lampholders, as will be described.

The hollow supporting casting 4 is adapted to support in spaced relation at the top opposed heads 71, each of which is adapted to mount a rotatable lampholder. Each of the heads 71 is of substantial Z-shape including an upstanding bearing portion 72 which is apertured for the reception (Fig. 3) of a ball bearing structure 74 which, in turn, rotatably supports a lamp holding sleeve 76.

At the lower end of each head 71, there is a depending supporting part 75 of plate-like form, adapted to be supported on the block 65 at the left of Fig. 1 and on the outer end face of supporting web 22 of the hollow supporting casting 4 at the right of Fig. 1. For this purpose, the depending portion 75 of each head 71 is provided with a plurality of open-sided slots 77, 78 and 80 which are adapted to receive swing bolts 81, which are swingably mounted on supporting block 65 and extension 22, 24, as by pivot screws 83, 85. Each swing bolt 81 has a thumb screw 82 for securing the part 75 of each head 71 in position.

The intermediate portion of each head 71 is provided with a bearing portion 84 (Figs. 1 and 3) for rotatably supporting a stub shaft 86 having an idler gear 88 mounted on the inner end thereof for engagement with the pinion 68 on the common operating shaft 64. The idler gear 88, in turn, meshes with a gear 87 which is slipped over the lamp holding sleeve 76 into engagement with a shoulder 89 on the sleeve where it is held against rotation, as by screws 91.

It will thus be apparent that upon operation of the motor 28, operating shaft 54 will be rotated and this, in turn, will rotate the common operating shaft 64, and through the idler gears 88 and ring gears 87, will simultaneously cause rotation of the lamp holding sleeves 76 in the same direction and at the same speed.

Each of the lamp holding sleeves 76 is provided with a slip ring 97 having an inwardly extending outer shoulder 99 adapted to engage the outer end of its corresponding lamp holding sleeve 76, and be secured thereto as by screws 98. Each of the lamp holding sleeves is provided with a central bore 93 having an internal shoulder 95 at the inner end thereof, with a compressible ring 92 mounted in each sleeve 76 and adapted to engage the shoulder 95 at one end. The compressible ring 92 may be formed of any suitable resilient deformable material, such as rubber or the like. A compression sleeve 94 is also mounted in the bore of each lamp holding sleeve 76, outwardly of the compressible ring 92, and it is adapted to be longitudinally moved inwardly into engagement with the compressible ring 92 by a threaded plug 96, which threadedly engages the inwardly extending flange 99 of the slip ring 97, all for a purpose which will be described.

Each of the heads 71 is provided with a plurality of brush holders 98 secured to the outer side of the upper bearing portion 72 thereof, and herein illustratively shown as being three in number (Fig. 2). Each of the brush holders 98 includes brushes 100 of a wear resistant conducting material, such as carbon or the like, and further includes a leaf spring 102 for biasing the brushes 100 inwardly against the outer surface of its corresponding slip ring 97. Each of the brush holders 98 also includes a terminal portion 104 electrically connected with its brush by a flexible shunt 106.

As previously stated, the lamp supporting apparatus constituting this invention, and of which one illustrative embodiment is specifically herein described and illustrated, is particularly adapted for supporting a lamp which provides illumination by means of an electric arc, such as the so-called short-arc high wattage mercury vapor lamps, which although producing an arc which is relatively short, is nevertheless of such intensity that if permitted to contact an area of the transparent lamp envelope for any appreciable length of time would result in damage to the envelope, and consequent failure of the lamp. The lamp 108 illustrated, is a lamp of this type and includes a transparent envelope, which may be of glass or other transparent material in which is provided a pair of spaced electrodes 110 mounted on electrode terminal rods 112 which extend in opposite directions in substantial alignment through the sealed integral extensions 114 of the lamp envelope, which likewise extend in opposite directions in substantial alignment from the main body of the lamp 108. Preferably, in this form of lamp, the electrode terminals and lamp extensions 114 are in alignment with each other and on an axis which extends centrally between the electrodes 110.

The outer ends of the electrode terminals 112 outside of the lamp envelope extensions 114, are each provided with a terminal block 116 rigidly attached thereto. In addition, one of the lamp extensions 114 is preferably provided with a metal sleeve 18 secured thereto in any desired manner, such as by being cemented thereon, and this sleeve has a lateral positioning flange 120 located in predetermined relation with respect to the gap between lamp electrodes 110, for a purpose to be described.

It will now be observed that the lamp 108 may be supported by the apparatus constructed in accordance with this invention by having the lamp extensions 114 positioned in the bores 93 of the lamp holding sleeves 76 in each head 71, and are secured therein by tightening the threaded plugs 96 to thus deform the compressible rings 92 and cause them to frictionally engage the corresponding lamp extensions 114. Each electrode terminal 112 of the lamp is electrically connected to its corresponding slip ring 97 by means of flexible shunts 122 (Fig. 1), which may be secured at one end to the slip ring by the securing screws 90, and each of which has at its other end a common split terminal clamp 124 adapted to fit over the terminal block 116 of the corresponding lamp electrode terminal 112, and to be secured thereon by a clamping screw 126.

With the lamp 108 in place, as illustrated in Figs. 1 and 3 of the drawings, it will be observed that when the motor 28 is operating, the lamp will be rotated about an axis aligned with the axis of the lamp, and consequently any bowing of the arc discharge between the lamp electrodes 110 will not be maintained in proximity with any given portion of the lamp envelope for any appreciable length of time, because the bowing will always be upwardly, and rotation of the lamp presents successively different portions of the lamp envelope at a location above the arc discharge between the lamp electrodes 110. Moreover, at the same time, air under pressure from blower 34, 36 will be supplied to the heads 71 to cool the heads and their bearings. It will further be noted that, since the lamp holding sleeves 76 are rotated in the same direction simultaneously and at the same rate of speed, no stress is imposed on the lamp envelope, but instead, both of the envelope extensions 114 are resiliently mounted by the compressible rings 92.

With a lamp mounted in place as shown in Figs. 1 and 3, it may be readily removed simply by loosening the threaded plugs 96 to relieve the frictional engagement of the compressible rings 92 with the lamp extensions 114. The lamp electrode terminal clamps 124 may then be removed simply by loosening the clamping screws 126. The wing nuts 82 for one of the heads 71 are then loosened and the swing bolts 81 may be then moved aside and the entire head 71 withdrawn, whereupon the lamp 108 may be simply withdrawn from the remaining head.

When it is desired to insert a new lamp, the reverse of the above procedure may be followed, namely, the new lamp may simply have one of its extensions 114 inserted into the head 71 which remains fixed on the support casting 4, the other head 71 may then be slid into position over the other lamp extension 114, and the bolts 81 moved into place and thumb nuts 82 tightened. The terminal clamps 124 may then be applied to the respective terminal blocks 116 on the lamp electrode terminal rods 112, after which the lamp is adjusted until positioning flange 120 thereon engages the adjacent head 71, whereupon the threaded plugs 96 are tightened to cause frictional engagement of the compressible rings 92, both with the corresponding lamp extension 114 and the lamp supporting sleeve 76, to thus frictionally connect the lamp extensions to the respective rotatable lamp holding sleeve 76.

Another advantage of lamp supporting structure constructed in accordance with this invention is that the structure can be mounted on a movable support, such as is commonly employed in searchlights without damage to the lamp envelope, and it also permits the use of deep reflectors mounted substantially coaxial with the lamp, so that the reflecting surface intercepts substantially all of the light flux emitted from the lamp. Flux emitted from the lamp is toroidal in shape, and can at best be but poorly utilized by conventional shallow parabolic reflectors.

Figure 5:
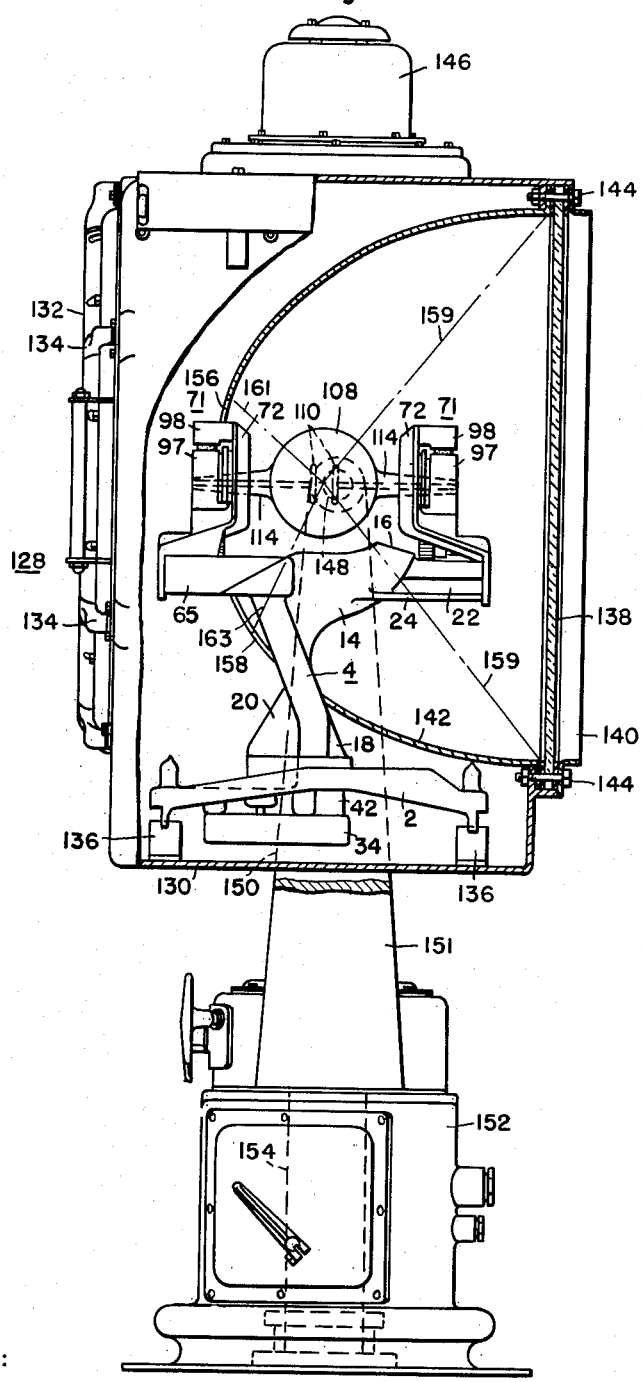
Fig. 5 is an elevation view, partly in section, of the apparatus shown in Fig. 1 considerably reduced in size, and illustrating its use in a searchlight having one form of reflector.

Fig. 5 of the drawings illustrates the lamp supporting structure comprising this invention incorporated in a searchlight, particularly with the supporting structure mounted within a searchlight casing 128. The searchlight casing 128 comprises a cylindrical flanged drum 130 having front and rear openings, with a rear door 132 adapted to be removably secured over the rear opening, for example, as by releasable securing clamps 134.

The lamp supporting structure is adapted to be supported in the cylindrical drum 130, as at 136. The searchlight casing has a front door 138 comprising a sheet of transparent material, such as glass or the like, which may be removably held over the front opening in the searchlight casing by a flanged ring 140 held in place by bolts 144, which may also pass through the peripheral flange of a reflector 142 which receives the lamp.

The searchlight casing may have ventilating means actuated, for example, by a motor contained within a motor casing 146 at the top of the searchlight casing, and the casing is adapted to be supported for pivotal movement about a substantially horizontal axis by pintles 148 located substantially centrally at opposite sides of the casing to be rotatably mounted in the upper ends of supporting arms 150, at the upper end of a supporting post 151. The arms 150 of supporting post 151 are preferably mounted for rotation about a vertical axis in a pedestal 152, and for this purpose the supporting post 151 has a lower bearing extension 154 which is reduced in cross-section area and is journaled in the pedestal 152.

The lamp 108 is thus mounted for universal movement and may assume almost an infinite number of different angular positions in horizontal and vertical planes, so that the rotatable support for the lamp is of particular value for use in this type of searchlight, for the reasons already stated.

The reflector 142 has a rear opening 156 which communicates with a slot 158 at the rear lower side so that the reflector 142 may be slipped into the front of the searchlight casing with the opening 156 and slot 158 adapted to receive the lamp supporting structure, and with the rear opening 156 in particular receiving the inner rotatable head 71 of the lamp support when the reflector is mounted in operative position. The reflector 142 is a relatively deep reflector having a short focal length, with the focal point thereof being located intermediate the lamp electrodes 110. This means that direct rays of light emanating from the light source comprising the electric discharge between electrodes 110 will emanate substantially in the form of a toroid having its center at substantially the focal point of the reflector 142, so that substantially all of the direct light rays included within the rays 159—161 and 159—163 will be intercepted by the reflector 142, and since this reflector is parabolic in form, the reflected rays will be directed substantially normal to the plane of the transparent door 138. In this way, and with this type of reflector, it is apparent that substantially all of the light flux emanating from the light source is reflected by the reflector 142 in a predetermined direction, and that this type of reflector located, as described above, makes extremely efficient use of the light emanating from the lamp 108.

Figure 6:
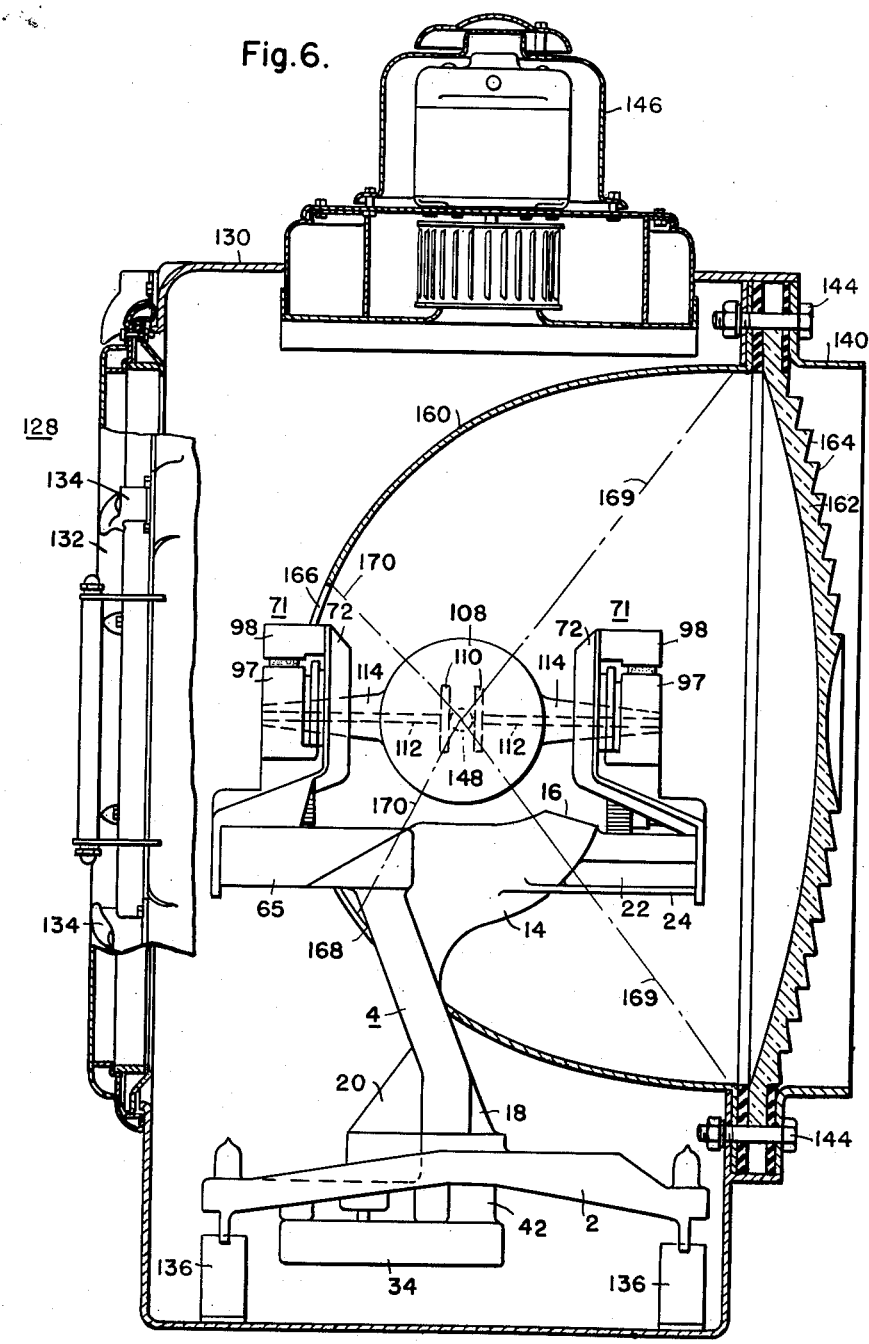
Fig. 6 is an enlarged section view of a portion of the searchlight shown in Fig. 5, but illustrating another form of reflector, and one type of lens which may be used.

In Fig. 6 of the drawings, there is illustrated a searchlight construction which is substantially identical with that shown in Fig. 5, and hence like reference numerals are employed to identify the identical parts, and description of such parts will not be repeated.

The principal difference in the structure shown in Fig. 6 over that of Fig. 5 resides in the reflector 160 which is ellipsoidal in form, so that direct light rays from lamp 108, which are intercepted by the reflector 160, are reflected in a convergent manner, as indicated by the ray traces 169 and 170. In addition, in place of the plane glass door 138 of Fig. 5, there is provided a door 162 in the form of a lens having a number of concentric, circular prisms 164 formed on the outer surface thereof, for the purpose of bending the reflected light rays, so that they emerge substantially parallel and substantially normal to the front wall of the searchlight casing.

The reflector 160 is similar to the reflector 142 in that it has a rear opening 166 and communicating rear lower slot 168 for receiving the lamp supporting mechanism when the reflector is inserted in the searchlight casing, so that it may be assembled in the same way as the reflector 142 shown in Fig. 5.

It is apparent that the reflector 160 makes substantially the same efficient use of light flux emanating from lamp 108 as the reflector 142, shown in Fig. 5, and that a similar beam of light is obtained with the use of lens 162.

As illustrated in Figs. 5 and 6, both deep parabolic and ellipsoidal reflectors best utilize the toroidal flux pattern emitted by these lamps when the lamp is aligned on the optical axis of the reflector with the flux toroid concentric therewith. Thus, the ray traces illustrated by the dot-dash lines in Figs. 5 and 6 illustrate that substantially all of the flux pattern emitted by the lamp impinges on the reflector surface and is reflected in a beam which is solid except for the central portion, and this will be filled in within a relatively short distance from the reflector by the normal convergence and divergence of the beam. Maximum efficiency is obtained with this type of mounting and reflector combination, because, though the central area of the reflector is not used, this does not result in any appreciable decrease in efficiency since the remaining portion of the reflector intercepts substantially all of the light emitted from this type of lamp. While a small portion of the light emitted from the lamp will be intercepted by the hollow supporting structure 4, this obviously is kept to a relatively small value by shaping the support so that it presents a very small area to light rays traveling from the lamp to the reflector.

I claim as my invention:

1. A device of the type described comprising, an electric discharge device having spaced electrodes forming the terminals of a high intensity arc type of discharge sealed in a transparent envelope, at least one supporting extension secured to said envelope and extending outwardly therefrom substantially in alignment with the gap between said electrodes, supporting means having rotatable means thereon supporting the extension of the discharge device for rotation on an axis which substantially coincides with the axis of the extension and is at an angle to the vertical, and means on said support for rotating said rotatable means.

2. A device of the type described comprising, an electric discharge device having spaced electrodes forming the terminals of a high intensity arc type of discharge sealed in a transparent envelope, at least one supporting extension secured to said envelope and extending outwardly therefrom substantially in alignment with the gap between said electrodes, supporting means having rotatable means thereon supporting the extension of the discharge device for rotation on an axis which substantially coincides with the axis of the extension and is at an angle to the vertical, said rotatable means including a rotatable head having a bore receiving said extension, a deformable sleeve in said bore about said extension, means on said rotatable means for deforming said sleeve to intimately engage said extension when inserted therein to drivingly connect said rotatable means to said discharge device, and means on said support for rotating said rotatable means.

3. A device of the type described comprising, an electric discharge device having spaced electrodes forming the terminals of a high intensity arc type of discharge sealed in a transparent envelope, at least one supporting extension secured to said envelope and extending outwardly therefrom substantially in alignment with the gap between said electrodes, supporting means having rotatable means thereon for supporting the extension of the discharge device for rotation on an axis which substantially coincides with the axis of the extension and is at an angle to the vertical, said rotatable means including a rotatable head having a bore receiving said extension, a deformable sleeve in said bore about said extension, longitudinally spaced abutments in said bore at each end of said sleeve, one of said abutments being movably mounted in the bore for deforming said sleeve to cause it to intimately engage said extension when inserted therein to drivingly connect said rotatable supporting means to said discharge device, and means on said support for rotating said rotatable means.

4. A device of the type described comprising, an electric discharge device having spaced electrodes forming the terminals of a high intensity arc type of discharge sealed in a transparent envelope, at least one supporting extension secured to said envelope and extending outwardly therefrom substantially in alignment with the gap between said electrodes, supporting means having rotatable means thereon for supporting the extension of the discharge device for rotation on an axis which substantially coincides with the axis of the extension and is at an angle to the vertical, means on said support for rotating said rotatable means, and means for adjustably supporting said supporting means to position said rotatable axis at various selected angles to the vertical.

5. A device of the type described comprising, an electric discharge device of the type having spaced electrodes forming the terminals of a high intensity arc type of discharge sealed in a transparent envelope, at least one supporting extension secured to said envelope and extending outwardly therefrom substantially in alignment with the gap between said electrodes, supporting means having rotatable means thereon for supporting the extension of the discharge device for rotation on an axis which substantially coincides with the axis of the extension and is at an angle to the vertical, said rotatable means including a rotatable head having a bore receiving said extension, resilient deformable material lining a portion of said bore for directly frictionally engaging said extension when inserted therein to drivingly connect said rotatable means to said discharge device, and means on said support for rotating said rotatable means.

6. A device of the type described comprising, an electric discharge device having spaced electrodes forming the terminals of a high intensity arc type of discharge sealed in a transparent envelope, opposed aligned supporting extensions secured to said envelope and extending outwardly therefrom substantially in alignment with the gap between said electrodes, supporting means having spaced aligned rotatable means thereon respectively, supporting the supporting extensions of the discharge device for rotation on an axis substantially coinciding with the axis of said extensions and is at an angle to the vertical, and means on said support for simultaneously rotating both of said rotatable supporting means.

7. Supporting means for electric discharge devices of the type having spaced electrodes forming the terminals of a high intensity arc type of discharge confined in a transparent envelope which has at least one supporting extension substantially in alignment with the gap between said electrodes and has a terminal of the discharge device extending through said supporting extension, comprising, supporting means having a supporting head rotatably mounted thereon with an axial opening through the head for receiving the supporting extension of the discharge device for rotation therewith on an axis substantially coinciding with the axis of said extension, said head having a releasable conductor clamp constructed to be rigidly clamped on the terminal of said extension when inserted in said head, a flexible conductor connecting said clamp to a slip ring portion of said head, and brushes engaging said slip ring portion for conducting current thereto.

8. A device of the type described comprising, an electric discharge device having spaced electrodes forming the terminals of a high intensity arc type discharge sealed in a transparent envelope, opposed aligned extensions secured to said envelope and extending outwardly therefrom substantially in alignment with the gap between said electrodes, electrode terminals extending through said extensions, respectively, supporting means, spaced discharge device supporting heads mounted on said supporting means, each of said heads having a rotatable mounting member having a common axis of rotation and an opening therethrough coinciding with its axis of rotation for receiving said extensions, respectively, means on said mounting members for securing the discharge device extensions therein, and means on said support for simultaneously rotating said mounting members.

9. Supporting means for electric discharge devices of the type having spaced electrodes forming the terminals of a high intensity arc type discharge confined in a transparent envelope which has opposed aligned extensions substantially in alignment with said electrodes and electrode terminals extending through said extensions, respectively, comprising, a supporting means, spaced discharge device supporting heads mounted on said support, each of said heads having a rotatable mounting member having a common axis of rotation and an opening therethrough coinciding with its axis of rotation for receiving said extensions, respectively, means on said mounting members for securing the lamp extensions therein, at least one of said heads being removably mounted on said support by movement thereof in the direction of said axis of rotation to permit ready mounting and demounting of the discharge device, and means on said support for simultaneously rotating said mounting members.

11. Supporting means for electric discharge devices of the type having spaced electrodes forming the terminals of a high intensity arc type discharge confined in a transparent envelope which has aligned extensions substantially in alignment with the gap between said electrodes and having electrode terminals extending through said extensions, respectively, comprising, supporting means, spaced discharge device supporting heads mounted on said support, each of said heads having a rotatable mounting member having a common axis of rotation and an opening therethrough coinciding with its axis of rotation for receiving said lamp extensions, means on said mounting members for securing the extensions therein, at least one of said heads being removably mounted on said support by movement thereof in the direction of said axis of rotation to permit ready mounting and demounting of the discharge device, each of said mounting members including a slip ring and a conductor secured thereto having a detachable clamp thereon at the outer end of the opening through the mounting member for ready attachment to the lamp terminal projecting therethrough, and means on said support for simultaneously rotating said mounting members.

11. Supporting means for electric discharge devices of the type having spaced electrodes forming the terminals of a high intensity arc type discharge confined in a transparent envelope which has opposed aligned extensions substantially in alignment with the gap between said electrodes and electrode terminals extending through said extensions, respectively, comprising, supporting means, spaced discharge device supporting heads mounted on said support, each of said heads having a rotatable mounting member having a common axis of rotation and an opening therethrough coinciding with its axis of rotation for receiving said extensions, means on said mounting members at the outer end of the opening through each mounting member for securing the extensions therein, at least one of said heads being removably mounted on said support to permit ready mounting and demounting of the discharge device, each of said mounting members including a slip ring and a conductor secured thereto having a detachable clamp thereon at the outer end of the opening through the mounting member for ready attachment to the terminal projecting therethrough, and means on said support for simultaneously rotating said mounting members.

12. Supporting means for electric discharge devices of the type having spaced electrodes forming the terminals of a high intensity arc type of discharge confined in a transparent envelope which has opposed aligned supporting extensions substantially in alignment with the gap between said electrodes, comprising, supporting means having spaced aligned rotatable means thereon for, respectively, supporting the extensions of the discharge device for rotation on a common axis substantially coinciding with the axis of said extensions, means on said support for simultaneously rotating both of said rotatable supporting means, a reflector having a surface of rotation located about the space between said rotatable supporting means and with its axis substantially coinciding with said axis of rotation so that it will intercept substantially all light flux emanating in toroidal shape from a light source positioned in said space, and said reflector having its focal point located at an intermediate point in said space substantially on said axis of rotation for reflecting the intercepted light in one direction generally parallel to said axis of rotation.

13. Supporting means for electric discharge devices of the type having spaced electrodes forming the terminals of a high intensity arc type of discharge confined in a transparent envelope which has opposed aligned supporting extensions substantially in alignment with the gap between said electrodes, comprising, supporting means having spaced aligned rotatable means thereon for, respectively, supporting the extensions of the discharge device for rotation on a common axis substantially coinciding with the axis of said extensions, means on said support for simultaneously rotating both of said rotatable supporting means, a reflector having a surface of rotation located about the space between said rotatable supporting means and with its axis substantially coinciding with said axis of rotation so that it will intercept substantially all light flux emanating in toroidal shape from a light source positioned in said space, said reflector having its focal point located at an intermediate point in said space substantially on said axis of rotation for reflecting the intercepted light in one direction generally parallel to said axis of rotation, and said reflector surface terminating in the opposite direction short of said axis of rotation such that substantially no reflected rays are directed at the rotatable supporting means.

14. Supporting means for electric discharge devices of the type having spaced electrodes forming the terminals of a high intensity arc type of discharge confined in a transparent envelope which has opposed aligned supporting extensions substantially in alignment with said electrodes, comprising, supporting means having spaced aligned rotatable means thereon for, respectively, supporting the extensions of the discharge device for rotation on a common axis substantially coinciding with the axis of said extensions, means on said support for simultaneously rotating both of said rotatable supporting means, a reflector having a surface of rotation located about the space between said rotatable supporting means and with its axis substantially coinciding with said axis of rotation and flaring outwardly in one direction toward one of said rotatable supporting means so that it will intercept substantially all light flux emanating in toroidal shape from a light source positioned in said space, said reflector having its focal point located at an intermediate point in said space substantially on said axis of rotation for reflecting the intercepted light in said one direction generally parallel to said axis of rotation.

15. A device of the type described comprising, an electric discharge device having spaced electrodes forming the terminals of a high intensity arc type of discharge confined in a transparent envelope which has opposed aligned supporting extensions substantially in alignment with the gap between said electrodes, supporting means having spaced aligned rotatable means thereon for, respectively, supporting the extensions of the discharge device for rotation on a common axis substantially coinciding with the axis of said extensions, means on said support for simultaneously rotating both of said rotatable supporting means, a reflector having a surface of rotation located about the space between said rotatable supporting means and with its axis substantially coinciding with said axis of rotation so that it will intercept substantially all light flux emanating in toroidal shape from a light source positioned in said space, said reflector having its focal point located at an intermediate point in said space substantially on said axis of rotation for reflecting the intercepted light in one direction generally parallel to said axis of rotation, and an abutment secured on one of said extensions at a predetermined distance from the gap between said electrodes and engageable with the rotatable means for its extension to thus locate the gap between said electrodes at a predetermined position to include the focal point of the reflector.

(References on following page)

References Cited in the file of this patent

UNITED STATES PATENTS

| | | |
|---|---|---|
| 1,878,229 | Beck | Sept. 20, 1932 |
| 1,885,830 | Hutchings et al. | Nov. 1, 1932 |
| 1,949,020 | Kreusler | Feb. 27, 1934 |
| 2,057,644 | Hall | Oct. 13, 1936 |
| 2,078,689 | Schneider | Apr. 27, 1937 |
| 2,313,192 | Decalion | Mar. 9, 1943 |
| 2,531,924 | Smyth | Nov. 28, 1950 |

FOREIGN PATENTS

| | | |
|---|---|---|
| 888,757 | France | Sept. 13, 1943 |